Patented Sept. 9, 1924.

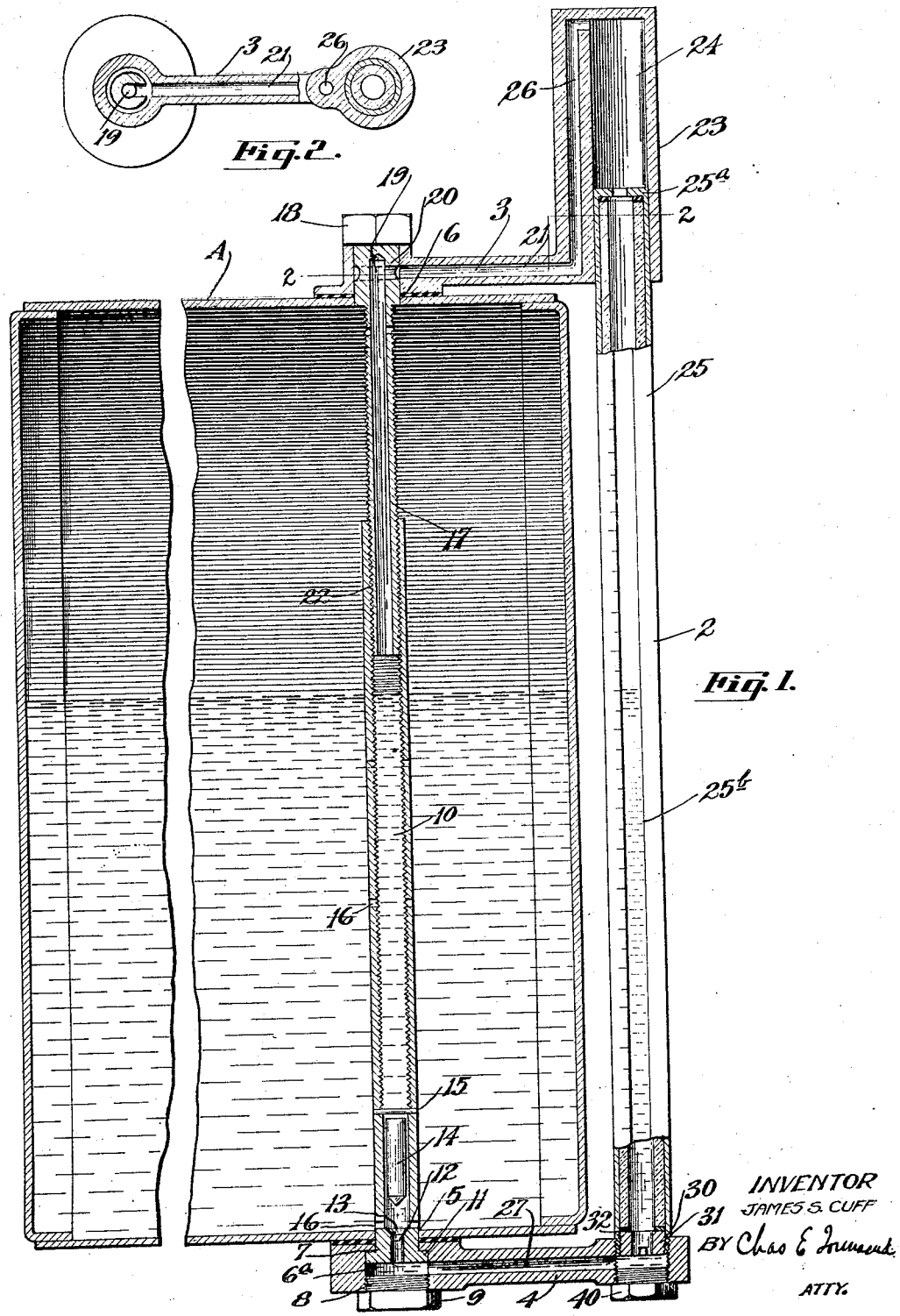

1,508,272

UNITED STATES PATENT OFFICE.

JAMES S. CUFF, OF VALLEJO, CALIFORNIA.

LIQUID-LEVEL GAUGE.

Application filed March 30, 1921. Serial No. 457,125.

*To all whom it may concern:*

Be it known that I, JAMES S. CUFF, a citizen of the United States, residing at Vallejo, in the county of Solano and State of California, have invented new and useful Improvements in Liquid-Level Gauges, of which the following is a specification.

This invention relates to liquid level indicators, and is particularly, although not exclusively, adapted for use in connection with gasoline tanks, for instance when mounted on automobiles and the like.

One of the objects of the present invention is to generally improve and simplify the construction of gauges of the character described; to provide a gauge which may be readily attached to any tank, and which will visibly and accurately indicate the level of the gasoline within the tank at all times.

Another object of the invention is to provide a gauge which may be attached to practically any tank, regardless of whether it be round, square, or otherwise, by merely perforating the upper and lower side of the tank, and which has a substantial range of adjustment so as to permit tanks of varying heights and diameters to be equipped with a standard equipment.

Another object of the invention is to provide novel means for enclosing and supporting the gauge glass, both to protect it against fracture by vibration, and against breakage by accidents; further to provide a structure which will permit removal and insertion of the gauge glass at any time without disturbing or disconnecting the remaining mechanism.

Another object of the invention is to provide an automatic float actuated check valve to prevent excessive escape of gasoline, if the gauge glass should be accidently broken.

Further objects will hereinafter appear.

The invention consists of the parts and the construction, combination and arrangement of parts as hereinafter more fully described and claimed, having reference to the accompanying drawings, in which—

Fig. 1 is a central vertical section of a tank showing the application of the invention.

Fig. 2 is a plan section on line 2—2, Fig. 1.

Referring to the drawings in detail, A indicates in general a tank of suitable construction, and 2 a gauge whereby the liquid level within the tank may be visibly and accurately determined at any time.

One of the main features of the present invention is the provision of a gauge which may be readily attached to any tank, regardless of whether it is round, square or otherwise, and even though the height or the diameter of the tank may vary to a considerable extent.

In the present instance I have provided a gauge consisting of an upper head member 3 and a lower head member 4. These head members are provided with openings at their inner ends which are adapted to register with openings 5 and 6 punched, drilled or otherwise formed, at one end of the tank. The lower head member 4 has an opening formed at its inner end, as indicated at 6ª, the upper end of the opening being shouldered as at 7 and registering with the bottom opening 5 in the tank. The lower portion of the opening is slightly enlarged and is threaded as at 8 to receive a screw plug 9. Adapted to be inserted through the opening 5 is an interiorly threaded tube 10. The lower end of this tube is provided with a shoulder or head 11 to engage the shoulder 7, and it is otherwise provided with a reduced outlet opening 12 in the lower end in which is formed a valve seat 13, adapted to be engaged by a float valve 14; said float valve being held against upward movement within the tube 10 by a cross-pin 15 mounted therein. The tube 10 is provided with a series of perforations such as shown at 16 to permit the gasoline or other liquid to enter the tube and to flow through the same into the gauge glass generally shown at 2.

The upper head member is similarly provided with an opening extending therethrough and adapted to align with the opening 6 formed in the upper part of the tank. A tube section such as shown at 17 is adapted to be inserted through the opening. This tube is closed at its upper end and is provided with a head 18 which limits the downward movement thereof. The tube is otherwise provided with a central passage 19 and a cross-passage 20 which is adapted to register with a longitudinally extending passage 21 formed in the upper head. The tube is also threaded on its exterior as at 22 and as such is adapted to be received by the lower tube 10, and as this tube is internally threaded it is obvious that one tube will screw into the other and as such form an adjustable rod or tube whereby the heads 3 and 4 may be tightly drawn together. The head member 3 terminates in a vertical extension 23. This extension is approximately circular in cross-section and is provided with a main central passage 24 for the reception of the gauge glass 2 and a tube 25 enclosing the same. The extension 23 is otherwise provided with a passage 26 which communicates with the upper end of the passage 24 and the longitudinal passage 21. The lower head member is also provided with a longitudinal passage as shown at 27, and its outer end is provided with an interiorly threaded passage for the reception of the lower end of the tube 25 and the gauge glass.

In actual operation if it is desired to apply a tank gauge constructed as here shown, it is only necessary to perforate the upper and lower sides of the tank as shown in the accompanying drawings; said perforations being formed by punching, drilling or otherwise. A gasket is next placed on each side of the tank and the heads 3 and 4 applied; the gauge enclosing tube 25 being at the same time placed in position. The tubes 10 and 17 are then inserted, the tube 10 first and the tube 17 secondly; said last named tube being turned by the square head 18 formed on the upper end, thus causing the threaded sections of the respective tubes to engage. A continued turning movement will cause the tube 17 to enter the tube 10 further and further, and a clamping or pulling action will at last be exerted which is sufficient to draw the heads tightly together against the opposite sides of the tank and the gaskets interposed between the same, thus forming a rigid and tight joint between the respective head members 3 and 4. Gaskets may also be inserted between the head 18 and the annular shoulder 11, if desired, to further insure against leakage. With the head sections and the gauge enclosing tube 25 in place, it is obvious that it will only be necessary to insert the gauge glass 2 and to secure this in position. This is accomplished by inserting the gauge glass through the lower end of the opening formed in the outer end of the head member 4. The upper end of the gauge glass when so inserted will engage the partially closed upper end of the tube 25 as shown at 25$^a$; a tight joint being here formed by the insertion of a gasket as shown. The lower end of the tube 25 is internally threaded as at 30 to receive a threaded bushing 31. A gasket 32 is first inserted and the bushing 31 is then screwed into place. This bushing is of course externally threaded to engage the threads 30 and the lower end is slotted to permit a screw driver to be inserted when the bushing is being screwed into place.

This bushing engages the gasket 32 and thereby clamps the gauge glass 2 tightly between the gaskets 32 and 25$^a$. A closing plug 40 is next inserted and finally the plug 9; gaskets being interposed between these plugs if desired. With the insertion of the plugs the work of installation is completed and the gauge is ready for action. The tank may now be filled to any level desired and it should then be obvious that the same level will be obtained in the gauge glass as the gasoline will freely enter the passage formed in the tube 10 and will flow from this passage through the longitudinal passage 27 into the lower end of the gauge glass. No compression will be formed in the upper end of the gauge glass as this is in free communication with the upper side of the tank through the passages 24, 26, 21, 20 and 19.

From the foregoing it should be obvious that any tank, regardless of whether it be round, square or otherwise shaped, may be quickly and readily fitted with a gauge constructed as here shown. The length of the tubes 10 and 17 is such that a considerable range of variations may be taken care of, that is tanks varying in height, say from two to six inches, can easily be taken care of with a standard equipment. The length of the gauge protecting tube 25 is also longer than required in most instances, and as this is freely movable in the passage 24, it is obvious that a considerable range of adjustment is also here permitted. No air-tight joint need be formed between the protecting tube 25 and the passage 24 as the liquid never enters this passage, but a fairly snug sliding joint should, however, be preferably provided.

By providing a support for the gauge glass, such as here shown, it is obvious that ordinary vibrations produced during the driving of a vehicle will have comparatively little effect upon the gauge glass as it is supported between two resilient gaskets such as shown at 25$^a$ and 32. It should furthermore be protected against breakage in case of accidents as it is almost entirely enclosed by the tube 25; this tube being slotted at opposite sides as at 25$^b$ to permit the liquid contained in the tube to be readily seen, and it may also be provided with a graduated scale as shown to further determine the liquid content. In case of accidents or breakage, it is obvious that the gauge glass can be readily removed without disturbing the remaining parts as it will only be necessary to remove the plug 40 and the bushing 30. The old glass may then be removed and a new one inserted. In fact the entire equipment has been constructed with the object in view of rendering the device universally adaptable for tanks of varying shapes and sizes; for rigidly supporting the same when in place, and to permit repair and adjustment to be made with the least loss of time and expense.

Another feature of the invention is the provision of the float 14. In case of breakage or other accident to the gauge glass, it is obvious that a considerable quantity of gasoline might escape. Such escape is, however, prevented in the present instance as a downward rush of gasoline through the tube 10 would instantly be checked by the float 14 as this would, under such circumstances, engage the seat formed in the lower end of the tube and thus prevent further escape of gasoline. The float may be constructed of any material desired, similarly the gauge glass, that is any suitable transparent material besides glass may be employed if desired. I also wish it understood that various changes in form and proportion may be resorted to within the scope of the appended claims, and that the materials and finish of the several parts employed may be such as the experience and judgment of the manufacturer may dictate or varying uses may demand.

Having thus described my invention, what I claim and desire to secure by Letters Patent is—

1. The combination of a tank having a pair of aligned perforations formed therein, one in the top and the other in the bottom of the tank, upper and lower head members having their inner ends registering with the respective perforations in the tank and having their outer ends extending outwardly beyond the side of the tank, said heads having passages formed therein and communicating with the tank through said perforations, a tubular gauge between the outer ends of said head members, means whereby to connect the gauge to said head members, the gauge having communication with the passages of the head members so as to indicate on the gauge the level of the liquid in the tank, connecting means extending through the head members and through the tank for drawing the head members tightly against the tank and provided with means interior of the tank to provide for the passage of liquid from the tank through the passages of said head members, and a safety valve disposed within said connecting means to prevent flow of liquid from the tank in event of breakage of the gauge glass.

2. The combination of a tank having a pair of aligned perforations formed therein, one in the top and the other in the bottom of the tank, upper and lower head members having their inner ends disposed over the respective perforations in the tank and having their outer ends extending outwardly beyond the side of the tank, said head members having passages formed therein, a pair of telescoping tubes insertible one in each head member and entering the tank, one of the telescoping tubes being interiorly screw threaded and the other exteriorly threaded whereby to telescopically connect the tubes together and whereby to permit the heads to be drawn tightly against the tank, the telescoping tubes having perforations therein whereby to establish communication between the interior of the tank and the tubes, the tubes having communication with the passages of the head members, a gauge glass between the outer ends of the head members, means whereby to connect the gauge to said head members, the gauge having communication with said passages, and a safety valve disposed within one of said tubes to prevent flow of liquid from the tank in the event of breakage of the gauge glass.

3. The combination of a tank having a pair of aligned perforations formed therein, one in the top and the other in the bottom of the tank, upper and lower head members having their inner ends disposed over the respective perforations in the tank and having their outer ends extending outwardly beyond the side of the tank, a pair of telescoping tubes connected to the head members and entering in the tank, one of the telescoping members being interiorly threaded and the other exteriorly threaded whereby to adjustably connect the tubes together and whereby to permit the heads to be tightly drawn against the tank, the telescoping tubes having perforations therein to permit the inflow of liquid thereinto from the tank and the said head members having passages communicating with the telescoping tubes, a glass gauge, and means for supporting the gauge in the outer ends of said head members adjacent the side of the tank, the gauge having communication with the passages of the head members, and a safety valve disposed within one of said tubes to prevent flow of liquid from the tank in the event of breakage of the gauge glass.

4. In a device of the character described, a tank, upper and lower head members provided with passages and having the inner ends of their passages communicating with the tank, a pair of telescoping tubular members within the tank, means to connect the telescoping members to the head members to draw the head members tightly against the top and bottom of the tank, the telescoping members having communication with the interior of the tank and also having communication with the passages of the head members, a gauge glass and means for mounting the gauge glass in the head members, the gauge glass having communication with the passages of the head members, and a safety valve located in one of said tubular member to prevent flow of liquid from the tank in the event of breakage of the gauge glass.

5. In a device of the character described, a tank, upper and lower hollow head members disposed at the top and bottom of the tank and having communication with the latter, a pair of threaded telescoping tubes extending through the tank and connected to and communicating with the hollow head members and operable so as to draw the upper and lower hollow head members tightly against the top and bottom of the tank, the telescoping tubes having perforations therein to establish communication between the interior of the tank and the hollow head members, a gauge glass disposed adjacent the side of the tank in spaced relation thereto and means connecting the gauge glass to the head members, the gauge glass having communication with the latter, whereby the liquid is permitted to flow from the tank through the telescoping tubes and through the head members and the gauge glass and whereby the level of the liquid in the tank is determined, and a safety valve located within one of said tubes to prevent flow of liquid from the tank in the event of breakage of the gauge glass.

6. In a device of the character described, the combination of a tank, head members connected to the tank and having passages therein which communicate with the interior of the tank, a gauge glass, means whereby to connect the gauge glass to said head members, the gauge glass having communication with the passages of the latter, a fluid passage passing through the head members and also extending through the tank and constructed and arranged for operation whereby to draw the head members tightly against the tank, and to permit flow of fluid through the same to the passages in the head members, and a valve located within said fluid passage and operable to prevent flow of liquid from the tank in the event of breakage of the gauge glass.

7. In a device of the character described, a tank, head members disposed one at the top and one at the bottom of the tank and having passages formed therein which have communication with the tank, a pair of telescoping members having threaded connection with each other and extending through the head members and through the tank, and operatively connected to the head members so as to draw the head members tightly against the tank, the head members extending outwardly beyond the sides of the tank, the upper head member having an upwardly directed extending portion which is hollow and which has communication with the passage of the upper head member, the telescoping members having perforations therein, a gauge glass disposed between the outer ends of the said members and having communication at its lower end with the passage of the lower head member and at its upper end communicating with the upwardly extending hollow portion of the upper head member, the upper end of the gauge glass having telescoping connection with said upwardly extending portion of the upper head member, means forming a fixed connection between the lower end of the gauge glass and the lower head member, and a valve located in one of said tubular members to prevent flow of liquid from the tank in the event of breakage of the gauge glass.

8. The combination of a tank having a pair of aligned perforations, one in the top and one in the bottom of the tank, upper and lower head members having connection with the tank at the points of perforations in the latter, and provided with internal passages, an adjustable perforated tubular connection in the tank having communication with the passages of said head members, the upper head member having an upwardly directed hollow extension which has communication with the passage of the upper head member, a gauge glass having telescopic fit in said hollow extension of the upper head member and removably fitted in the lower head member and having communication both with said hollow extension of the upper head member and the passage of the lower head member, and a safety valve located within said tubular connection to prevent flow of liquid from the tank in the event of breakage of the gauge of glass.

9. The combination of a tank having a pair of perforations formed therein, one in the top of the tank and the other in the bottom thereof, upper and lower tubular head members having their inner ends fitted over said perforations in the tank and having internal passages which have communication with the tank through the aforesaid perforations, a pair of adjustably connected perforated tubes having connection with said head members and having communication with the passages of the head members, a gauge glass, and means for yieldably and removably supporting the gauge glass in the head members adjacent the side of the tank, the gauge glass having communication with the passages of the head members, one of said tubular members having a valve seat, and a valve adapted to seat itself upon the valve seat in the event of breakage of the gauge glass so as to prevent excessive loss of fluid from the tank.

10. The combination of a tank, upper and lower head members having connection at their inner ends with the tank and provided with internal passages which have communication with the interior of the tank, a pair of telescoping tubes insertible one in each head member and entering the tank in telescoping relation, said tubes being perforated and having communication with the passages in the head members, a gauge glass, means for removably supporting the gauge glass in the outer ends of the head members, and a safety valve located in the lowermost tube to close communication between the tubes and the lower head member in the event of breakage of the gauge glass and thereby prevent escape of fluid from the tank upon breakage of the gauge glass.

11. The combination of a tank having perforations one in the top and one in the bottom of the same, upper and lower head members having passages communicating with the tank through said perforations, an adjustable hollow connection within the tank and connecting the head members operable to bind the same tightly against the tank and perforated to receive fluid from the tank and convey the fluid to the passage of one of the head members, a gauge glass, means whereby to removably mount the gauge glass in the head members, the gauge glass having communication with the passages of the head members, and a valve located within said adjustable hollow connection operable to prevent flow of liquid from the tank in the event of breakage of the gauge glass.

12. The combination of a tank having perforations one in the top and one in the bottom of the same, upper and lower head members having passages communicating with the tank through said perforations, an adjustable hollow connection within the tank and connecting the head members and operable to bind the head members tightly against the tank and having perforations to receive fluid from the tank to convey the fluid to the passage of one of the head members, a gauge glass, means to removably mount the gauge glass in the head members, the gauge glass having communication with the passages of the head members, and a safety valve located at the lower end of the said adjustable hollow connection operable to prevent flow of liquid from the tank through said lower head member in the event of breakage of the gauge glass.

13. In a device of the character described, a tank, upper and lower head members provided with passages and having the inner ends of their passages communicating with the tank, a pair of telescoping tubular members within the tank, means to connect the telescoping members to the head members to draw the head members tightly against the top and bottom of the tank, the telescoping members having communication with the interior of the tank, and also having communication with the passages of the head members, a gauge glass, and means for mounting the gauge glass in the head members, the gauge glass having communication with the passages of the head members.

14. The combination of a tank having perforations, one in the top and one in the bottom of the same, upper and lower head members having passages communicating with the tank through said perforations, an adjustable hollow connection within the tank and connecting the head members and operable to bind the head members tightly against the tank and perforated to receive fluid from the tank and convey the fluid to the passage of one of the head members, a gauge glass and means whereby to removably mount the gauge glass in the head members, the gauge glass having communication with the passages of the head members.

JAMES S. CUFF.

Witnesses:
A. BYRNE,
H. J. ADEN.